United States Patent
Cano Cediel et al.

(10) Patent No.: US 9,108,359 B2
(45) Date of Patent: Aug. 18, 2015

(54) METHOD FOR PREVENTION OF POROSITY IN COMPOSITE MATERIAL PARTS

(71) Applicant: Airbus Operations, S.L., Getafe (ES)

(72) Inventors: Jose David Cano Cediel, Madrid (ES); Pedro Nogueroles Vines, Esquivias (ES)

(73) Assignee: Airbus Operations, S.L., Getafe (ES)

( * ) Notice: Subject to any disclaimer, the term of this patent is extended or adjusted under 35 U.S.C. 154(b) by 0 days.

(21) Appl. No.: 13/871,089

(22) Filed: Apr. 26, 2013

(65) Prior Publication Data
US 2013/0287954 A1 Oct. 31, 2013

(30) Foreign Application Priority Data

Apr. 26, 2012 (ES) .................................. 201230623

(51) Int. Cl.
| | | |
|---|---|---|
| *B29C 65/02* | (2006.01) | |
| *B29C 65/48* | (2006.01) | |
| *B29C 65/52* | (2006.01) | |
| *B32B 37/12* | (2006.01) | |
| *B32B 38/00* | (2006.01) | |
| *B32B 43/00* | (2006.01) | |
| *C08J 5/00* | (2006.01) | |
| *B29C 63/00* | (2006.01) | |
| *B29C 70/54* | (2006.01) | |

(52) U.S. Cl.
CPC ............ *B29C 63/0047* (2013.01); *B29C 70/547* (2013.01)

(58) Field of Classification Search
CPC .... B29C 63/0047; B29C 65/02; B29C 65/18; B29C 65/48; B29C 66/919; B29C 70/34; B29C 70/547; B32B 7/06; B32B 37/26; B32B 38/18; B32B 38/1808; B32B 2309/02; C08J 5/12

USPC ........ 156/247, 289, 307.1, 308.2, 309.6, 701, 156/719
See application file for complete search history.

(56) References Cited

U.S. PATENT DOCUMENTS 3,683,722 A * 8/1972 Pears ........................... 76/107.1
3,995,080 A 11/1976 Cogburn et al.
(Continued)

FOREIGN PATENT DOCUMENTS

| EP | 1400341 A1 | 3/2004 |
| JP | H01194389 A | 8/1989 |
| WO | WO 2005/060386 A2 | 7/2005 |

OTHER PUBLICATIONS

Spanish Search Report dated Apr. 26, 2012 in Spanish Application No. 201230623 w/translation of category of cited documents.

*Primary Examiner* — Sing P Chan
(74) *Attorney, Agent, or Firm* — Oblon, McClelland, Maier & Neustadt, L.L.P.

(57) ABSTRACT

The invention discloses a method for prevention of porosity in composite material parts (1), which is applied when the curing stage of the part (1) is being carried out on a female tool (2). In the curing stage, an adhesive (4) is placed on at least one of the areas of the radii (5) of the composite material part (1), so that the possible subsequent appearance of porosity in said areas of the composite material part (1) is prevented. Thus, the adhesive (4) acquires the fluidization temperature before the resin of the composite material and it is displaced filling the holes generated during the placement of the part (1) on the female tool (2), in the area of the radii (5) of the part (1), during the coupling between the part (1) and the female tool (2).

7 Claims, 2 Drawing Sheets

(56) References Cited

U.S. PATENT DOCUMENTS

| | | | |
|---|---|---|---|
| 4,305,903 A * | 12/1981 | Krause | 264/258 |
| 5,707,576 A | 1/1998 | Asher | |
| 8,211,530 B2 * | 7/2012 | Mead et al. | 428/174 |
| 2005/0060386 A1 | 3/2005 | Seo | |

* cited by examiner

METHOD FOR PREVENTION OF POROSITY IN COMPOSITE MATERIAL PARTS

OBJECT OF THE INVENTION

The present invention is related to a method through which the porosity in the area of the radii in composite material parts is reduced or eliminated when the curing of said parts is carried out on a female tool. The invention is applicable in the field of the manufacture of parts for the aeronautic industry.

TECHNICAL PROBLEM TO BE SOLVED AND BACKGROUND OF THE INVENTION

In the aeronautic industry, the use of composite materials in the manufacture of parts used in the construction of aircraft, which meet the requirements demanded by the aeronautic industry is becoming increasingly more widespread.

One of the common manufacturing methods for said parts starts from a prepreg material as a raw material and comprises three steps: laminating, forming and subsequent curing.

In the last step of the manufacturing method, with the part already formed and consolidated, the aforementioned part is placed on a female curing tool in which the curing of the part is carried out.

The female curing tool consists of parts which are called die supports, there being outer die supports, which are the ones which adopt the shape and dimensions of the formed part along its outer surface, inner die supports, which adopt the shape and dimensions of the part along its inner surface and a base part.

The manufacturing method for composite material parts which includes curing in a female tool presents a number of advantages:
  An outer surface with the geometric precision of the tool, which allows an easier subsequent assembly of the part, ensuring very tight tolerances,
  the use of sacrifice fabrics involving a surcharge and requiring a subsequent machining is prevented,
  the appearance of wrinkles in the area of the radii is prevented.

However, this method presents a drawback which appears in the area of the radii of the manufactured part, and it is the lack of compaction in that area.

This problem occurs due to the poor coupling between the part, as it comes out of the male forming tool, and the female tool on which it is cured. Due to this poor coupling, there are holes between the part already formed and the female curing tool, and these holes generate a negative pressure differential in the area of the radius, which leads to the accumulation of volatiles in said are during the curing stage. The aforementioned accumulation of volatiles in the area of the radius appears in the part already cured as porosity along the thickness of the part or even as layer porosity.

Currently, in order to avoid the aforementioned porosity, complex tools with a very high economic value which aim to increase the pressure in the area of the radii are manufactured.

The present invention proposes a simple, effective and cheap method for solving the problem of the occurrence of porosity or local delaminations in the area of the radii of the manufactured part.

DESCRIPTION OF THE INVENTION

The present invention discloses a method for prevention of porosity in composite material parts which solves the problem of the porosity that appears in the areas of the radii when the curing of the part takes place in a female tool.

The manufacture of a composite material part comprises a stage of lamination, a stage of forming, and a stage of curing which can be carried out in a female tool. In the stage of curing in a female tool, due to an irregular coupling between the female curing tool and the part, some holes in at least one of the areas of the radii of the part are created.

In the method object of the invention, before submitting the part to the curing stage, an adhesive is placed in, at least, one of the areas of the radii of the part, it is fluidized and it is displaced filling the holes existing between the part and the female curing tool.

In the method object of the invention the adhesive is fixed to the composite material part in the area of the radii of the part or it is included in the female curing tool in an area of the female curing tool that corresponds with the area of the radii of the composite material part when the composite material part is placed on the female curing tool.

In an alternative embodiment of the method object of the invention, between the composite material part and the adhesive, there can be placed a layer of peelable material which is removed after carrying out the curing of the part, dragging with it the adhesive.

The adhesive used in the method for prevention of porosity in composite material parts is in the form of a film and it has the following characteristics:
  in an initial state it has characteristics of easy handling and placement,
  the fluidization temperature is lower than the fluidization temperature of the resin of the composite material, and
  it hardens before the resin of the composite material is cured.

DESCRIPTION OF THE FIGURES

To complete the description and with the object of helping for a better understanding of the characteristics of the invention, this specification is accompanied by a set of figures where, with illustrative character and without limitation, the following has been represented.

Figure 1:
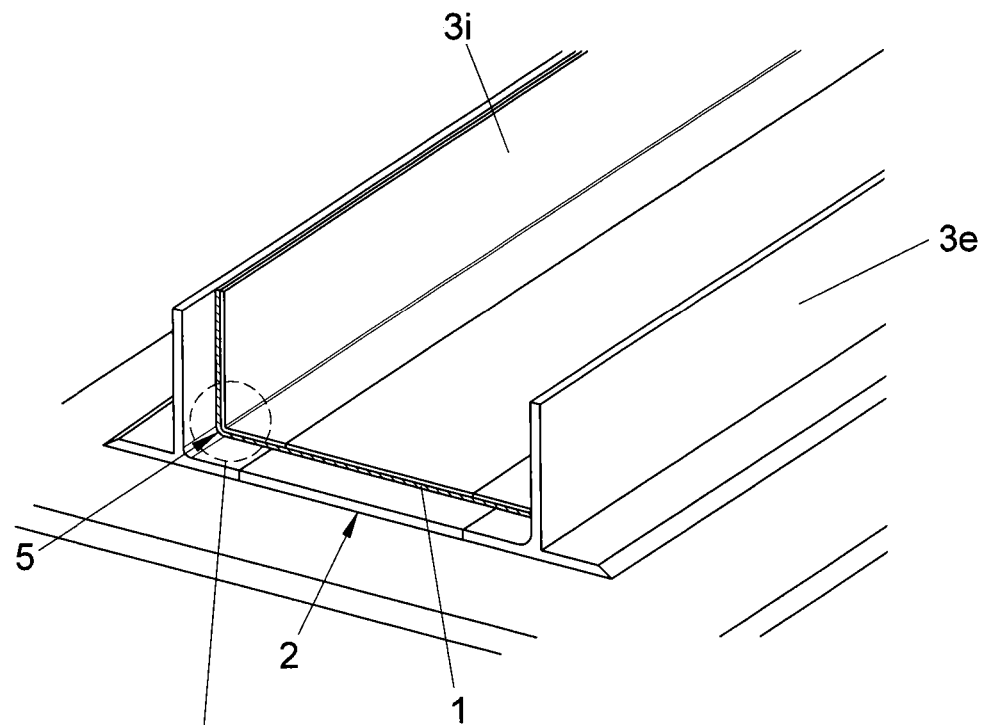
FIG. 1 is a perspective view of the part placed on the female tool used in the curing. In this figure the inner die supports are also represented; said view includes a detail of the area of the radii of the part.
Figure 1:
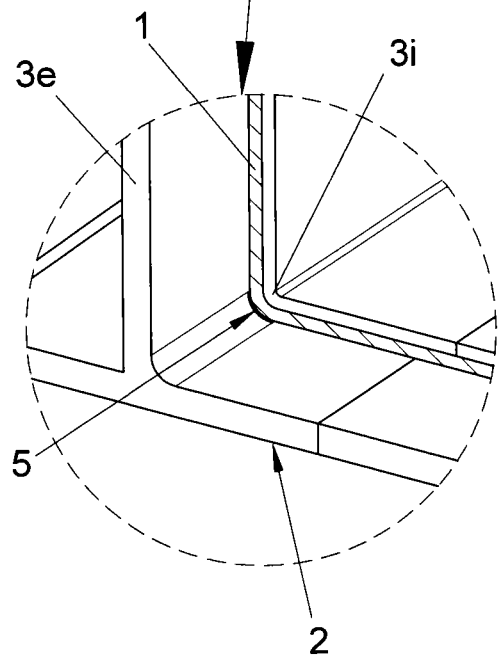
Figure 2:
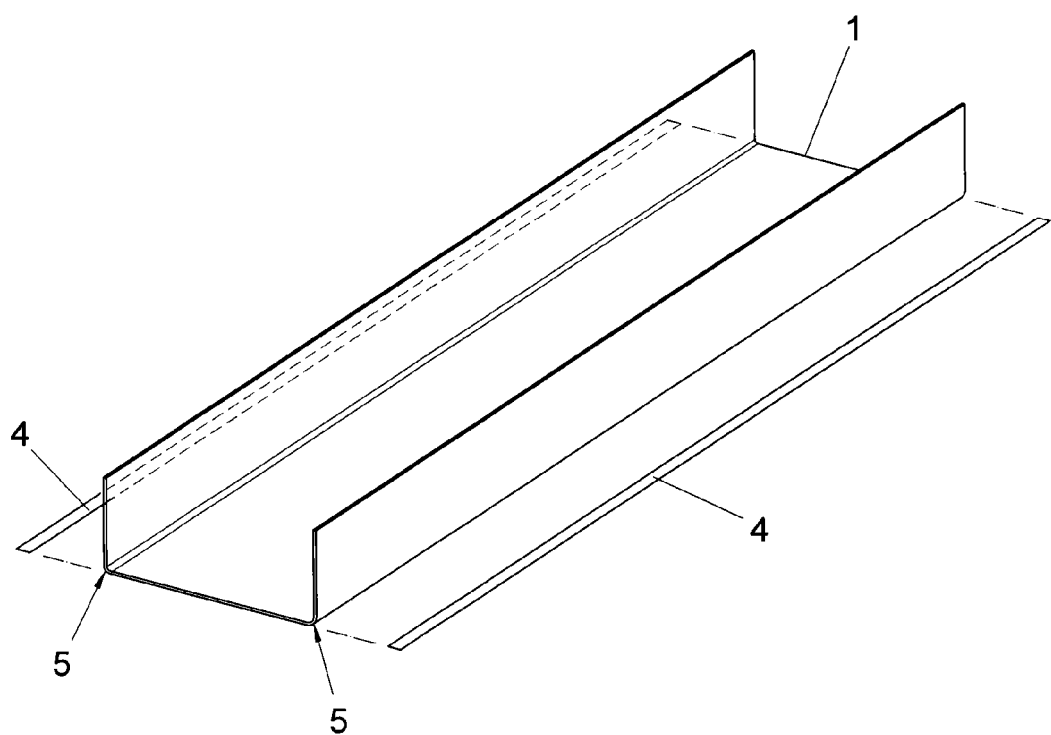
FIG. 2 is a perspective view of the formed part with two strips of adhesive located separated from the part on both sides; said view indicates the position in which the adhesive is placed.

A list of the elements represented in the figures that integrate the invention is shown below:
1.—part,
2.—female tool,
3$i$.—inner die support,
3$e$.—outer die support,
4.—adhesive,
5.—area of the radii.

DETAILED DESCRIPTION OF THE INVENTION

The object of the invention is a method through which the porosity occurring in the composite material parts, in the area of the radii (5) of the parts (1) when these parts (1) undergo a stage of curing on a female tool (2) during the manufacturing method is prevented.

The method for manufacturing parts (1) of composite material that is currently used comprises:

a lay up stage;

a second stage of forming on a forming male tool, and a last stage of curing, wherein the formed part (1) is transferred to a female curing tool (2) and said formed part (1) undergoes a heat and pressure cycle, through which, the final features of the manufactured part (1) from the composite material are obtained.

The female tool (2) of the curing is made up of parts that are called die supports. These die supports reproduce the shape and dimensions of the final part (1) to be obtained. There are two different types of die supports; if they are placed on the outside of the part (1), they are outer die supports (3e), which reproduce the external geometry of the part (1), or if they are placed on the inside of the part (1), they are inner die supports (3i), which reproduce the inner shape of the aforementioned part (1).

For carrying out the curing stage, first the external geometry of the part (1) to be obtained is configured through the attachment of different outer die supports (3e), then the part (1) is attached on the aforementioned outer die supports (3e), and subsequently the inner die supports (3i) are placed in the interior of the part (1) reproducing the internal geometry of the part (1). On this female curing tool (2) the part (1) undergoes, at least, one pressure and temperature cycle which provides the part (1) with its final geometry.

Experience shows that during the coupling of the part (1) on the outer die supports (3e) of the female curing tool (2) small holes are generated (not represented in the figures) in the area of the radii (5) of the part (1) since the coupling between the part (1) and the female tool (2) is irregular.

In the method for prevention of porosity object of the invention an adhesive (4) is placed in the area of the radii (5) of the part (1) between the part (1) and the female curing tool (2) before submitting the part (1) to the curing cycle.

The existing cavity between the female curing tool (2) and the part (1) is a low pressure area wherein all the volatiles existing in the laminated part will tend to concentrate during the curing process. To prevent this, the adhesive flows prior to the consolidation process of the resin filling said low pressure area which results in an increase of the pressure in the area until it matches the pressure existing in the rest of the part.

The adhesive (4) is consolidated before the resin is consolidated, which is why by means of the adhesive (4) the necessary response pressure is exerted on the resin which subsequently hardens, and thus the occurrence of porosity in the part is prevented.

Thus, the adhesive (4) used in the method of prevention of porosity object of the invention, is in the form of film and meets a series of requirements:

in the initial state it is a material that can be handled and positioned in the place of use in a simple way;

the fluidization temperature of the adhesive (4) is lower than the fluidization temperature of the resin of the composite material on which the adhesive (4) is attached;

the adhesive (4) consolidates before the resin of the composite material reaches its curing.

With an adhesive (4) that meets these requirements, before the placement of the part (1) on the female curing tool (2) the adhesive (4) can be distributed in a simple way in the areas where the experience demonstrates that there are created holes between the part (1) and the female tool (2).

If the adhesive (4) is to be removed in a simple way, in an embodiment of the method object of the invention, a layer of peelable material (not depicted in the figures) is placed between the adhesive (4) and the part (1). That material has the property that, when the curing of the part (1) has already concluded, it comes off of the part (1) without affecting the characteristics of the part (1), i.e., when the layer of peelable material is removed, it drags with it all the adhesive (4) used during the curing.

The invention should not be limited to the particular embodiment described in this document. The persons skilled in the art can develop other embodiments in view of the description made here. As a result, the scope of the invention is defined by the following claims.

The invention claimed is:

1. Method for prevention of porosity in composite material parts including a resin, the method comprising the steps of:
   providing a female tool;
   laying at least one said composite material into said female tool;
   forming said part by compressing; and
   curing said formed part by heat;
   further comprising a step, performed prior to curing the formed part, of applying an adhesive to at least one area of a radii of the composite material, which adhesive, during said curing of the composite material, fills holes generated by an irregular coupling between said part and said female curing tool in at least one area of said radii of said formed part,
   wherein the adhesive is easy to handle and place in the steps prior to curing the formed part, has a fluidization temperature which is lower than a fluidization temperature of the resin of the composite material and hardens before the resin of the composite material is cured.

2. Method for prevention of porosity in composite material parts, according to claim 1 wherein the adhesive is placed on an area of the female curing tool which corresponds to the area of the radii of the composite material part, when the composite material part is placed in the female curing tool.

3. Method for prevention of porosity in composite material parts, according to claim 2, wherein the adhesive is in the form of a film.

4. Method for prevention of porosity in composite material parts, according to claim 2 wherein between the adhesive and the composite material part there is a layer of peelable material, which is removed after carrying out the step of curing of the composite material part, dragging also the adhesive when removing the layer of peelable material.

5. Method for prevention of porosity in composite material parts, according to claim 1, wherein the adhesive is in the form of a film.

6. Method for prevention of porosity in composite material parts, according to claim 5 wherein between the adhesive and the composite material part there is a layer of peelable material, which is removed after carrying out the step of curing of the composite material part, dragging also the adhesive when removing the layer of peelable material.

7. Method for prevention of porosity in composite material parts, according to claim 1 wherein between the adhesive and the composite material part there is a layer of peelable material, which is removed after carrying out the step of curing of the composite material part, dragging also the adhesive when removing the layer of peelable material.

* * * * *